United States Patent [19]

von Gemmingen

[11] Patent Number: 4,627,856

[45] Date of Patent: Dec. 9, 1986

[54] PROCESS FOR THE ADSORPTIVE SEPARATION OF STEAM AND A LESS READILY ADSORBABLE COMPONENT FROM A GASEOUS STREAM

[75] Inventor: Ulrich von Gemmingen, Munich, Fed. Rep. of Germany

[73] Assignee: Linde Aktiengesellschaft, Wiesbaden, Fed. Rep. of Germany

[21] Appl. No.: 679,670

[22] Filed: Dec. 10, 1984

[30] Foreign Application Priority Data

Dec. 15, 1983 [DE] Fed. Rep. of Germany ....... 3345438

[51] Int. Cl.$^4$ ............................................. B01D 53/04
[52] U.S. Cl. ........................................... 55/31; 55/33; 55/35; 55/59; 55/74; 55/75
[58] Field of Search ............... 55/31, 33, 35, 58, 59, 55/62, 68, 74, 75, 179, 208, 269, 387, 389

[56] References Cited

U.S. PATENT DOCUMENTS

| | | | |
|---|---|---|---|
| 3,221,477 | 12/1965 | Arnoldi et al. | 55/33 X |
| 3,237,379 | 3/1966 | Kant et al. | 55/58 |
| 3,252,268 | 5/1966 | Stark | 55/58 X |
| 3,359,707 | 12/1967 | Jean | 55/33 |
| 3,365,859 | 1/1968 | Sandberg | 55/58 X |
| 3,594,984 | 7/1971 | Toyama et al. | 55/33 |
| 3,710,547 | 1/1973 | Nelson | 55/58 |
| 3,719,025 | 3/1973 | Heinze et al. | 55/31 |
| 3,738,084 | 6/1973 | Simonet et al. | 55/31 |
| 3,808,773 | 5/1974 | Reyhing et al. | 55/31 |
| 3,841,058 | 10/1974 | Templeman | 55/33 |
| 3,923,477 | 12/1975 | Armond et al. | 55/58 X |
| 4,144,038 | 3/1979 | Armond | 55/58 |
| 4,233,038 | 11/1980 | Tao | 55/33 |
| 4,273,621 | 6/1981 | Fornoff | 55/33 X |
| 4,299,596 | 11/1981 | Benkmann | 55/58 X |
| 4,326,858 | 4/1982 | Benkmann | 55/31 X |
| 4,477,265 | 10/1984 | Kumar et al. | 55/58 X |

FOREIGN PATENT DOCUMENTS

4465 10/1979 European Pat. Off. ................ 55/33

*Primary Examiner*—Robert Spitzer
*Attorney, Agent, or Firm*—Millen & White

[57] ABSTRACT

In a process for the adsorptive separation of steam and a less readily adsorbable component, e.g., carbon dioxide, from a gaseous stream, wherein after termination of an adsorption phase, a hot scavenging gas is conducted through the adsorber for regeneration purposes, and the adsorber comprises at least two series-connected adsorption beds, essentially the entire steam being adsorbed in the first adsorption bed and, in the second adsorption bed, substantially only the less readily adsorbable component being adsorbed, and that, during at least a part of the hot-scavenging phase, scavenging gas is conducted directly to the outlet ends of the two adsorption beds.

8 Claims, 3 Drawing Figures

PROCESS FOR THE ADSORPTIVE SEPARATION OF STEAM AND A LESS READILY ADSORBABLE COMPONENT FROM A GASEOUS STREAM

BACKGROUND OF THE INVENTION

This invention relates to an adsorption process for the separation of steam and less readily adsorbable component e.g. $CO_2$ from a gaseous stream e.g. air wherein hot scavenging gas is employed to regenerate the adsorbent. (Where the term "steam" is used herein, it is meant to include water molecules in the gaseous phase at any temperature and in any concentration, thus for example embracing the humidity of room temperature air.)

In a conventional process of this type, described in DAS No. 2,064,137 and citing as the important feature the use of zeolitic molecular sieve as the adsorbent, the energy consumption for regeneration of the loaded adsorbent is reduced by providing that the temperature of the hot scavenging gas, instead of the usual 200°–300° C., be less than 200° C., scavenging gas temperatures down to 80° C. being set forth. However, it was found under practical conditions that the calculations forming the basis for DAS No. 2,064,137 were too optimistic, for the molecular sieve intended as the adsorbent could no longer be satisfactorily desorbed at scavenging gas temperatures of below 150° C. Therefore, modern plants for the separation of steam and carbon dioxide from gaseous streams operate with a scavenging gas temperature of about 170° C. Examples of such processes are, inter alia, the pretreatment of gaseous streams to be subjected to a low-temperature process in order to prevent the danger of troublesome solid deposits, for example in cryogenic air fractionation, in the processing of natural gas, synthesis gases, or cracked gases.

SUMMARY

An object of the present invention is to provide a process of the type discussed above along with associated apparatus permitting lower energy requirements for the thermal regeneration of an adsorber loaded with water and less readily adsorbable component.

Upon further study of the specification and appended claims, further objects and advantages of this invention will become apparent to those skilled in the art.

These objects are attained by providing that the gaseous stream flows, during an adsorption phase, through two series-connected adsorption beds where, in the first adsorption bed, essentially the entire steam and, in the second adsorption bed, substantially only the less readily adsorbable component alone are adsorbed, and that during at least a portion of the hot-scavenging phase, the scavenging gas is fed directly to the outlet ends of the two adsorption beds.

The invention is based on the observation that in the conventional processes with the use of a single adsorption bed traversed during a hot-scavenging phase countercurrently to the adsorption direction, a large fraction of the heat in the scavenging gas is consumed for both the desorption of less readily absorbable component and especially for heating the adsorbent in the outlet zone of the adsorber, i.e. before reaching the steamloaded zone. Consequently, the high temperature level of the scavenging gas is thereby unavailable for the desorption of the water, i.e. the component most strongly bound to the adsorbent. Thus, the heretofore necessary high scavenging gas temperature of about 170° C. had to be maintained in order to ultimately provide a temperature level operable for water desorption, this latter temperature being actually considerably below the initial temperature of the scavenging gas.

Thus, this invention provides that at least a part of the scavenging gas, heated to a suitable temperature, is conducted directly to the water-loaded zone for the purpose of water desorption. In this way the scavenging gas is not cooled off beforehand while flowing through another zone. Accordingly, the loss of thermal energy encountered in a conventional through-flow process can be avoided thereby contributing directly toward a reduction in the energy requirement for the adsorption process.

A portion of the scavenging gas is conducted for desorption purposes through the second adsorption bed loaded substantially with the less readily adsorbable component. This can take place in parallel to the introduction of the scavenging gas into the first adsorption bed or in chronological succession; in this connection, the scavenging gases for the two adsorption beds can optionally also have different temperatures.

In a further development of the process of this invention, a provision is made that the first adsorption bed is subdivided into two layers wherein the first layer is of such a size that a water-saturated zone is present therein in the loaded condition of the adsorber, whereas the second layer contains in the loaded condition both steam and the less readily adsorbable component. Such a subdivision of the first adsorption bed is advantageous especially when using different adsorbents in the two layers. In this case, in the first layer next to the adsorber inlet end, there can be used an adsorbent which has a high loading capacity for water when treating a gas having a relatively high proportion of steam without it being necessary that this adsorbent exhibit a special suitability for obtaining very low water vapor concentration in the purified gas. The adsorption of the remaining water vapor under a low partial pressure can then be effected in the second layer of the first adsorption bed on an adsorbent specifically suitable for such separating functions. Suitable as adsorbents for the first layer are, for example, alumina gel or silica gel while zeolitic molecular sieves, e.g. zeolite 4A, 5A, 10X or preferably 13X are suitable for the second layer.

The subdividing of the first adsorption bed into two layers is advantageous not only when using different adsorbents in the two layers, but also from the viewpoint of process technology. Thus, it is expedient in some cases, for example with an arrangement having separate vessels for the two adsorption beds, to conduct the water-free scavenging gas loaded with less readily adsorbable component, which exits from the second adsorption bed, through the first layer of the first adsorption bed during at least part of the scavenging phase.

Since regeneration of a water-loaded adsorbent is more difficult than regeneration of an adsorbent loaded with less readily adsorbable component, a higher amount of energy must also be expended for the first-mentioned regenerating task. Taking this fact into account, it proved to be advantageous in a process with two adsorption beds arranged in separate vessels, which are traversed in parallel by the scavenging gas, to charge the first adsorption bed with 30–80%, preferably with about 40 to 80%, especially about of the scavenging gas to attain uniform regeneration of both adsorption beds.

In a special embodiment of the process, the scavenging gas is conducted in succession through both adsorption beds, the scavenging gas being heated only after passing through the second adsorption bed and prior to entering the first adsorption bed. This type of operation is advantageous if the scavenging gas is available, even without it first being heated, under conditions permitting adequate regeneration of the second adsorption bed, which is frequently the case. For example, wherein $CO_2$ is the less readily adsorbable component and the adsorbent is a zeolite, it is sufficient for the scavenging gas to have a temperature of at least 20° C.

If the adsorption beds are arranged in a single vessel, it is merely necessary to provide a conduit for withdrawal of the scavenging gas between the adsorption beds and a feed conduit for the heated scavenging gas into the first adsorption bed, while the arrangement in two separate vessels requires no additional structural changes whatsoever.

In an advantageous embodiment of the invention, two adsorption beds are arranged in a common vessel, and the scavenging gas is conducted in chronological succession to the outlet ends of the two adsorption beds. In this arrangement, the second adsorption bed is preferably first charged with hot scavenging gas until this adsorption bed has been sufficiently regenerated, i.e. freed of less readily adsorbable component; and then the scavenging gas is conducted directly to the outlet end of the first adsorption bed in order to introduce the high temperature of the scavenging gas directly into this zone. In using such a technique, it proved to be advantageous to conduct the scavenging gas during a period of 30-70%, preferably 40 to 60%, especially about 50%, of the duration of the hot-scavenging phase to the outlet end of the second adsorption bed and to conduct the scavenging gas, during the remaining duration of the hot-scavenging phase, to the outlet end of the first adsorption bed. Furthermore, during the first partial phase while the scavenging gas is conducted through the second adsorption bed, the scavenging gas loaded with less readily adsorbable component is also passed through the first adsorption bed and is withdrawn from the inlet end of the latter. This procedure not only avoids additional structural measures for discharging the scavenging gas downstream of the second adsorption bed but also makes it possible to commence this phase with a limited pre-desorption of the steam.

When the process of this invention with two or more adsorbers, equipped respectively according to the invention with two series-connected adsorption beds, they are operated in conventional cyclic alternation, wherein at least one adsorber passes through an adsorption phase and yields a product stream freed of steam and less readily adsorbable component, while at least one other adsorber is being regenerated. The temperature of the scavenging gas required for regeneration can be, as compared to conventional adsorption methods, lower by about 50° to 120° C. The particular regenerating temperature depends in each case on the type of adsorbent employed, the duration of the cycle of the adsorption process, and additional process parameters. When, for example, using a zeolitic molecular sieve, especially zeolite 13X, in the first and second adsorption beds, or when using alumina gel in the first adsorption bed or in the first layer of the first adsorption bed, scavenging gas temperatures can be maintained at between 60° and 120° C., preferably between 80° and 100° C. while achieving excellent regeneration results. In this arrangement, the regeneration is performed preferably according to the so-called "Thermopulse" method wherein the hot-scavenging phase is relatively brief and lasts approximately between 25 and 60 minutes. A cold-scavenging step follows the hot-scavenging phase, as usual; during this cold-scavenging step, the previously regenerated adsorber is recooled to the adsorption temperature.

In many cases, carbon dioxide and/or hydrocarbons appear as the components less readily adsorbable than steam. Thus, the invention is applicable not only to the purification of air where $CO_2$ is the less readily adsorbable component, but also to the purification of natural gas when higher hydrocarbons, especially $C_5+$-hydrocarbons, and/or $CO_2$ are the less readily adsorbable components, or to similar purification processes for other gas streams such as, e.g. synthesis gas or refinery gas. Furthermore, the process of the invention is applicable in the purification of gases which contain methanol vapour and $CO_2$, e.g. gases obtained by the Rectisol scrubbing process. In such cases, methanol is the more readily and $CO_2$ is the less readily adsorbable component and, consequently, methanol then takes the place of steam in the whole process.

BRIEF DESCRIPTION OF THE DRAWINGS

Additional details of the invention will be described below with reference to the preferred embodiments illustrated schematically in the figures wherein.

DETAILED DISCUSSION OF THE DRAWINGS

Figure 1:
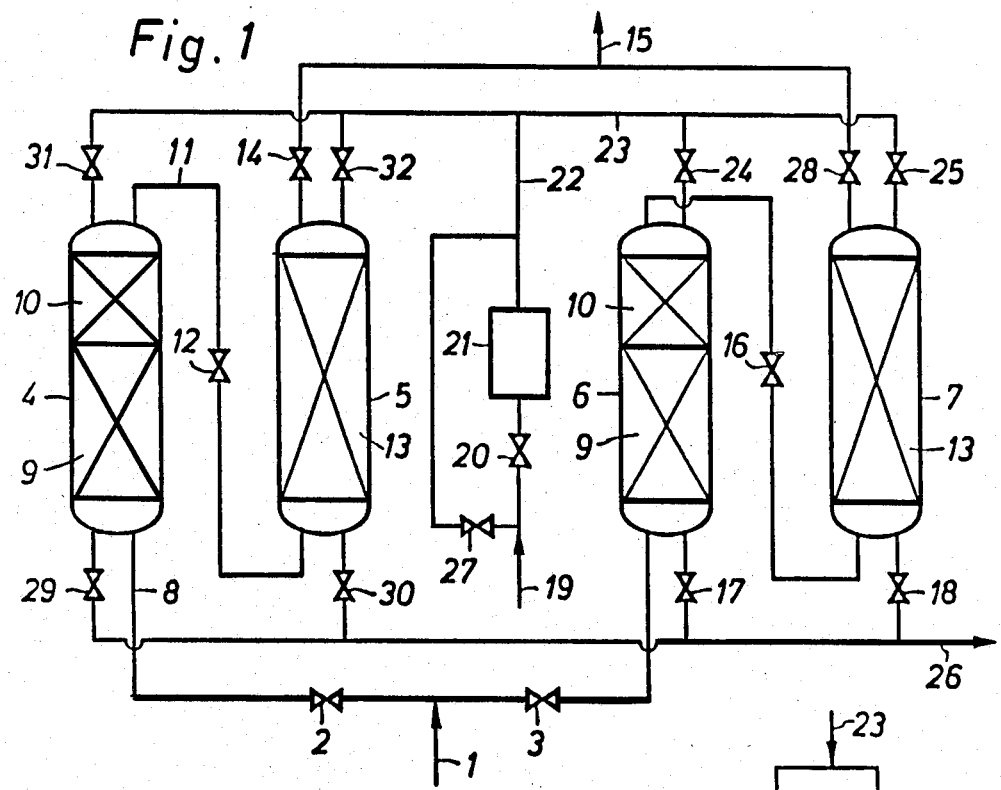
FIG. 1 shows a first embodiment of the invention with two alternatingly operated adsorber groups, each group having different adsorber beds connected in series.

In the embodiment shown in FIG. 1, raw gas, e.g. air compressed to a pressure of about 6 bar, is introduced via conduit 1 and conducted alternatingly, through opened valve 2 or 3, to a first adsorber unit consisting of vessels 4 and 5, or to a second adsorber unit consisting of vessels 6 and 7. With the valve 2 being open, the raw gas passes via conduit 8 into vessel 4 and flows first through a first adsorption layer 9 of alumina gel and amounting to about two-thirds of the adsorbent packing in the vessel 4. While flowing through the layer 9, the largest portion of the water vapor contained in the raw gas is adsorbed so that during the downstream passage of the raw gas through the adsorbent packing 10 of zeolite 13X, the adsorption of only residual water vapor and a portion of the carbon dioxide takes place. The gas, freed completely of water, exits via conduit 11 and is conducted via the opened valve 12 to the inlet end of adsorber vessel 5. This vessel contains an adsorbent packing 13 of zeolite 13X or another conventional adsorbent suitable for the adsorption of carbon dioxide. The purified gas exits via the opened valve 14 from vessel 5 and is withdrawn by way of conduit 15 as the product gas.

While the series-connected adsorber vessels 4 and 5 pass through an adsorption phase, the adsorber vessels 6 and 7, previously loaded with water vapor and carbon dioxide, respectively, are regenerated. For this purpose, with the valve 16 being closed and the valves 17 and 18 being opened, a pressure reduction of the adsorbers 6 and 7 to atmospheric pressure is first effected. Thereafter, a scavenging gas supplied via conduit 19 through valve 20 is heated to a temperature of about 100° C. in the heating device 21, and the heated gas is conducted via conduits 22, 23 and valves 24, 25 in parallel and counter-currently to the adsorption direction through the adsorber vessels 6 and 7. During this step, a scavenging gas loaded with desorbed components is withdrawn via the valves 17 and 18 and discharged by way of the residual gas conduit 26. The valves 24 and 25 are set so that about 50% of the scavenging gas is introduced via valve 24 into the vessel 6 to perform water desorption therein.

After termination of the hot-scavenging phase, the adsorber vessels 6 and 7 are recooled by cold scavenging gas back to the adsorption temperature, this time period being still during the adsorption phase in the parallel-operated adsorber vessels 4 and 5. For this purpose, the scavenging gas fed via conduit 19 is conducted via the open valve 27, with the valve 20 being closed, to conduit 22 and from there via conduit 23 and the open valves 24 and 25 through the vessels 6 and 7 and is finally withdrawn as residual gas via conduit 26.

For heating the scavenging gas during the hot-scavenging phase to about 100° C., energy must be expended which, for example, can be transferred from the heat of compression by heat exchange of the scavenging gas with the raw gas after the latter is compressed to about 6 bar.

After termination of the adsorption phase in vessels 4 and 5 and/or of the desorption phase in vessels 6 and 7, valves 2, 12, 14, 17, 18, 24, and 25 are closed and the corresponding valves 3, 16, 28, 29, 30, 31, and 32 are opened whereupon the two adsorber groups are operated under mutually exchanged operating conditions.

Figure 2:
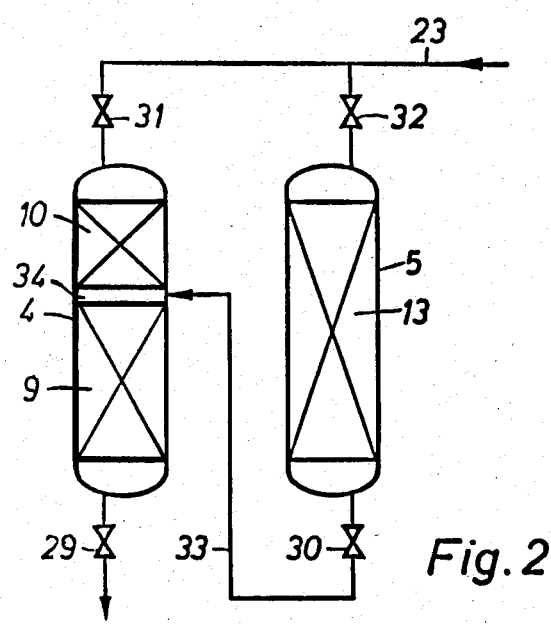
FIG. 2 shows a detail of a second embodiment of the invention, wherein hot scavenging gas and scavenging gas existing from the adsorber used for the less readily adsorbable component are passed to the steam adsorption bed

FIG. 2 relates to a variant of the process depicted in FIG. 1; for reasons of clarity, only one adsorber group and the components passed through during regeneration are illustrated. The modification with respect to the process shown in FIG. 1 resides in that, during regeneration of the adsorbers, the carbon-dioxide-loaded scavenging gas, exiting from the subsequently connected adsorber for carbon dioxide adsorption, is introduced via conduit 33 into the first adsorption bed between the two layers 9 and 10. For this purpose, the two layers 9 and 10 are no longer arranged directly one on top of the other, but rather are separated from each other by an interspace 34. Thus, the entire desorbate-loaded scavenging gas stream is withdrawn via the opened valve 29. As compared with the embodiment illustrated in FIG. 1, the version of FIG. 2 offers the advantage that the requirement for generating gas is reduced.

Figure 3:
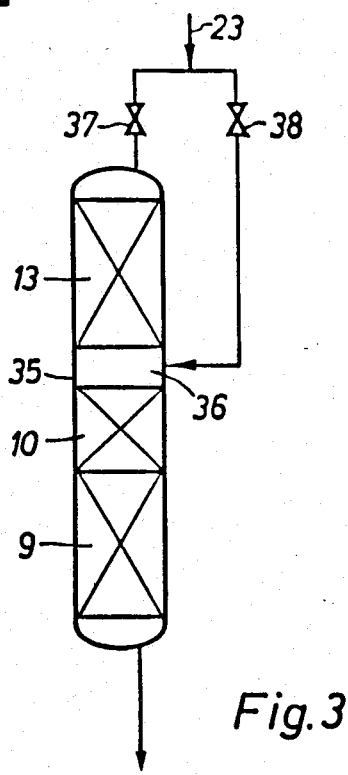
FIG. 3 shows a detail of a third embodiment of the invention wherein a single adsorber contains three adsorber beds.

In the embodiment of this invention illustrated in FIG. 3, the two adsorption beds with the adsorbent packings 9, 10, and 13 are disposed in a vessel 35 common to both of them. Between the packings 10 and 13 an interspace 36 is arranged. In the regeneration of such an installation, the scavenging gas fed via conduit 23 is first conducted, with the valve 37 being opened, countercurrently to the adsorption direction through the vessel 35 until the adsorption bed 13 loaded with carbon dioxide has been adequately regenerated. A period of about 50% of the hot-scavenging phase is required for this purpose. Thereafter, valve 37 is closed, and the hot scavenging gas is conducted, via the then opened valve 38, into the interspace 36 so that it is passed directly through the water-loaded layers 10 and 9.

The preceding embodiments can be repeated with similar success by substituting the generically or specifically described reactants and/or operating conditions of this invention for those used in the preceding embodiments.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the adsorptive separation of steam and less readily adsorbable component from a gaseous stream comprising passing the gaseous stream during an adsorption phase to the inlet end of an adsorber and withdrawing from the outlet end of the adsorber the gaseous stream depleted of steam and less readily adsorbable component; terminating the adsorption phase; passing a hot scavenging gas through the adsorber and withdrawing from the adsorber a scavenging gas loaded with desorbed less readily adsorbable component and steam; the improvement, in which the gaseous stream is air and the less readily adsorbable component is carbon dioxide which comprises passing the air stream during the adsorption phase, through two series-connected adsorption beds where the two adsorption beds are arranged in an adsorber common to both of them, the first adsorption bed being subdivided into two layers, wherein essentially only steam is adsorbed in the first layer contiguous to the inlet end of the adsorber, and wherein steam and carbon dioxide are absorbed in the second layer, the first adsorption bed in the adsorber contains alumina gel in the first layer and a zeolite molecular sieve in the second layer, and in the first adsorption bed, essentially the entire amount of steam is adsorbed and in the second adsorption bed, substantially only carbon dioxide is adsorbed; and passing the scavening gas during a first part of the hot-scavening phase, directly to the outlet end of the second adsorption bed and during a second part of the hot scavenging phase, directly to the outlet end of the first adsorption bed; and withdrawing, during a first and second part of the hot-scavenging phase, scavenging gas loaded with desorbed carbon dioxide and steam from the first adsorber inlet end.

2. A process according to claim 1, wherein scavenging gas, during a period of about 30–70% of the duration of the hot-scavenging phase, is conducted to the outlet end of the second absoprtion bed and, during the remaining period of the hot-scavenging phase, is conducted to the outlet end of the first adsorption bed; and wherein the scavenging gas loaded with desorbed components is withdrawn during both phases from the inlet end of the first adsorption bed.

3. A process according to claim 1, wherein scavenging gas, during a period of about 50% of the duration of the hot-scavenging phase, is conducted to the outlet end of the second adsorption bed and, during the remaining period of the hot-scavenging phase, is conducted to the outlet end of the first adsorption bed; and wherein the scavenging gas loaded with desorbed components is withdrawn during both phases from the inlet end of the first adsorption bed.

4. A process according to claim 1 wherein the zeolite molecular sieve is zeolite 13X.

5. A process according to claim 1, wherein the temperature of the scavenging gas is 60°–120° C.

6. A process according to claim 1, wherein the temperature of the scavenging gas is 80°–100° C.

7. A process according to claim 1, wherein the duration of the hot-scavenging phase is between 25 and 60 minutes.

8. In a process for the adsorptive separation of methanol and less readily adsorbable component from a gaseous stream comprising passing the gaseous stream during an adsorption phase to the inlet end of an adsorber and withdrawing from the outlet end of the adsorber the gaseous stream depleted of methanol and less readily adsorbable component; terminating the adsorption phase; passing a hot scavenging gas through the adsorber and withdrawing from the adsorber a scavenging gas loaded with desorbed less readily adsorbable component and methanol; the improvement in which the gaseous stream is air and the less readily adsorbable component in carbon dioxide which comprises passing the air stream during the adsorption phase, through two series-connected adsorption beds where the two adsorption beds are arranged in an adsorber common to both of them, the first adsorption bed being subdivided into two layers, wherein essentially only methanol is adsorbed in the first layer contiguous to the inlet end of the adsorber, and wherein methanol and carbon dioxide are adsorbed in the second layer, the first adsorption bed in the adsorber contains alumina gel in the first layer and a zeolitic molecular sieve in the second layer, and in the first adsorption bed, essentially the entire amount of methanol is adsorbed and in the second adsorption bed, substantially only carbon dioxide is adsorbed; and passing the scavenging gas during a first part of the hot-scavenging phase, directly to the outlet end of the second adsorption bed and during a second part of the hot scavenging phase, directly to the outlet end of the first adsorption bed; and withdrawing during a first and second part of the hot-scavenging phase, scavenging gas loaded with desorbed carbon dioxide and methanol from the first adsorber inlet end.

* * * * *